(12) United States Patent
Wakatsuki et al.

(10) Patent No.: US 7,118,013 B2
(45) Date of Patent: Oct. 10, 2006

(54) α-CYANOACRYLATE ADHESIVE SYSTEMS

(75) Inventors: Kizuku Wakatsuki, Ibaraki (JP); Yukinori Nishino, Osaka (JP); Eizo Kajigaki, Takatsuki (JP)

(73) Assignee: Taoka Chemical Company, Limited, Osaka (JP)

( * ) Notice: Subject to any disclaimer, the term of this patent is extended or adjusted under 35 U.S.C. 154(b) by 153 days.

(21) Appl. No.: 10/250,698

(22) PCT Filed: Dec. 28, 2001

(86) PCT No.: PCT/JP01/11617

§ 371 (c)(1),
(2), (4) Date: Jul. 7, 2003

(87) PCT Pub. No.: WO02/055621

PCT Pub. Date: Jul. 18, 2002

(65) Prior Publication Data

US 2004/0059030 A1 Mar. 25, 2004

(30) Foreign Application Priority Data

Jan. 9, 2001 (JP) ............................. 2001-000934

(51) Int. Cl.
*B67D 3/00* (2006.01)
*B32B 1/02* (2006.01)
(52) U.S. Cl. ...................... 222/386; 222/568; 222/546; 222/215; 222/212; 428/35.7
(58) Field of Classification Search ............... 428/35.7; 222/215, 420, 156, 204, 297, 568, 386, 546, 222/212; 526/204, 297
See application file for complete search history.

(56) References Cited

U.S. PATENT DOCUMENTS

| | | | | |
|---|---|---|---|---|
| 4,171,416 A | * | 10/1979 | Motegi et al. | 526/245 |
| 4,313,865 A | * | 2/1982 | Teramoto et al. | 524/753 |
| 4,906,317 A | * | 3/1990 | Liu | 156/307.3 |
| 4,958,748 A | * | 9/1990 | Otake | 222/131 |
| 4,980,086 A | * | 12/1990 | Hiraiwa et al. | 252/511 |
| 6,294,629 B1 | * | 9/2001 | O'Dwyer et al. | 526/297 |
| 6,323,275 B1 | * | 11/2001 | Takahashi et al. | 524/765 |
| 6,830,704 B1 | * | 12/2004 | Tajima et al. | 252/182.12 |
| 2003/0039781 A1 | * | 2/2003 | D'Alessio et al. | 428/35.7 |

FOREIGN PATENT DOCUMENTS

| GB | 1 573 491 A | 8/1980 |
|---|---|---|
| JP | 62-100568 A | 5/1987 |
| JP | 2001-164199 A | 6/2001 |

\* cited by examiner

*Primary Examiner*—David W. Wu
*Assistant Examiner*—Satya B. Sastri
(74) *Attorney, Agent, or Firm*—Birch, Stewart, Kolasch & Birch, LLP

(57) ABSTRACT

An α-cyanoacrylate adhesive system, having an excellent fast setting property in the adhesion of hardly adhering materials and porous materials; having an excellent storage stability, even when a plastic material is used for at least a part of container for the adhesive composition, nozzle, cap and tube; using an α-cyanoacrylate adhesive composition comprising an α-cyanoacrylate and 0.05 to 5.0% by weight, based on said α-cyanoacrylate, of 12-crown-4-ether; and using a container for containing the adhesive composition, a nozzle and a cap, and optionally a tube for sending the adhesive composition to the nozzle, at least a part of said container, nozzle, cap and tube being made of a plastic material is provided.

14 Claims, No Drawings

α-CYANOACRYLATE ADHESIVE SYSTEMS

This application is the national phase under 35 U.S.C. § 371 of PCT International Application No. PCT/JP01/11617 which has an International filing date of Dec. 28, 2001, which designated the United States of America.

BACKGROUND OF THE INVENTION

1. Field of the Invention

The present invention relates to an adhesive system of an α-cyanoacrylate adhesive composition.

More precisely, the present invention relates to an adhesive system of an α-cyanoacrylate adhesive composition used with a plastic container, a plastic nozzle, a plastic cap, or a plastic tube to convey the adhesive composition to the nozzle. The adhesive has an excellent fast setting property and excellent storage stability, and can be preferably used for the adhesion of difficult to adhere materials such as acryl resins, chrome plating, nickel plating, FRP, Bakelite, thermoplastic elastomers (hereinafter, abbreviated as TPE) EPDM rubbers and the like, and porous materials such as papers, woods, leathers, ceramics and the like.

2. Description of Related Art

α-Cyanoacrylates easily cause anion polymerization by anionic active species, such as moisture, an alkaline material or the like, in a material to be adhered, or in the air, and so they find wide application as instantaneous adhesives for rubbers, plastics, metals, glass and the like.

However, conventional α-cyanoacrylate adhesives do not have a sufficient fast setting property for the adhesion of difficult to adhere materials such as acryl resins, chrome plating, nickel plating, FRP, Bakelite, TPE, EPDM rubbers, porous materials such as papers, woods, leathers, ceramics and the like.

As a means for eliminating this defect, a method in which a hardening accelerator is added to an α-cyanoacrylate adhesive composition has been known. Various compounds have been attempted from 1975 to 1985 as hardening accelerators. For example, polyethylene glycol derivatives are disclosed in JP-A-54-28342 and calix-arenes are disclosed in JP-A-60-179482. In addition, JP-B-55-2238 discloses that crown ethers (15-crown-5-ether, 18-crown-6-ether and dicyclohexyl-18-crown-6-ether) are effective as hardening accelerators for the adhesion of porous materials such as papers, woods and the like.

On the other hand, however, another defect appeared in that the storage stability of the adhesive itself is remarkably reduced when a hardening accelerator is added to the extent where a sufficient fast setting property of a hard to adhere material is obtained.

Therefore, in order to store an α-cyanoacrylate adhesive composition containing a hardening accelerator for a long term, it is necessary to store the adhesive composition in a metal container that is completely impermeable to water, or when the adhesive composition is stored in a plastic container permeable to water, it is necessary to store it in an atmosphere controlled to a low humidity. These are very inconvenient storage problems. Even if a metal container is used, when one or both of a nozzle or a cap is made of a water-permeable plastic material such as polyethylene, polypropylene or the like, moisture permeates therethrough and thus a lowering of the storage stability cannot be avoided. For example, the moistening of the adhesive composition retained in the inside of the nozzle proceeds after applying the adhesive composition to a material to be adhered, causing rapid gelation, setting or the like. Upon the next application of the adhesive, problems arise in that the nozzle becomes blocked and the adhesive composition cannot be squeezed from the container. Nozzle clogging is frequent and has been one of great defects of the α-cyanoacrylate adhesive system. In addition, sometimes the problem arises that the entire adhesive composition in the plastic container becomes hardened and the adhesive cannot be used. Improvement in all of these respects has been earnestly demanded.

In industrial adhesive applicators, the adhesive composition is introduced to a plastic nozzle as an outlet through a plastic tube. The plastic tube is made of a water permeable material, having a narrow diameter. Also in this case, thickening, gelation or hardening due to moistening tends to occur in a tube or nozzle during interruption or use in the summer. Improvement in this respect is also earnestly demanded.

Therefore, JP-A-62-100568 proposes an adhesive composition having a fast setting property with improved stability during storage and use. The publication describes that the storage stability is improved as compared with conventional products when $BF_3$, $SO_2$ and 18-crown-6-ether or the like is added to 2-cyanoacrylate. Even if such an adhesive composition is used, however, when a water-permeable plastic material is used for the nozzle or other plastic parts, nozzle clogging is likely to occur and therefore a satisfactory storage stability has not been attained. In other words, an adhesive used with a water-permeable plastic material, for example a nozzle, container or the like and which has an excellent fast setting property and an excellent storage stability has never been obtained.

SUMMARY OF THE INVENTION

The purpose of the present invention is to provide an α-cyanoacrylate adhesive system having an excellent fast setting property in the adhesion of difficult to adhere materials such as acryl resins, chrome plating, nickel plating, FRP, Bakelite, TPE, EPDM rubbers and porous materials such as papers, woods, leathers, ceramics and the like, the adhesive system has excellent storage stability, and no nozzle clogging when a plastic material is used for at least a part of the adhesive dispensing system, such as the container for the adhesive composition, a nozzle, a cap, a tube and the like.

As the result of extensive studies for solving these problems of the conventional adhesives, it has been found that, in a α-cyanoacrylate adhesive composition, when 0.05 to 5.0% by weight of 12-crown-4-ether is added to an α-cyanoacrylate, an excellent fast setting property in the adhesion of difficult to adhere materials such as acryl resins, chrome plating, nickel plating, FRP, Bakelite, TPE, EPDM rubbers, porous materials such as papers, woods, leathers, ceramics and the like is obtained and setting during use or storage is substantially avoided, even if a plastic material is used for elements of the conventional system, e.g., nozzles, caps, tubes, and the like.

Therefore, the present invention provides an adhesive system which consists of an α-cyanoacrylate adhesive composition comprising an α-cyanoacrylate and 0.05 to 5.0% by weight, based on said α-cyanoacrylate, of 12-crown-4-ether. The adhesive system can be used with containers, nozzles and caps, tubes, etc. which are made at least in part of a plastic material.

DETAILED DESCRIPTION OF THE INVENTION

The present invention is described below in detail.

The nozzle used in the present invention is connected to a container body housing the adhesive composition. A tube and nozzle can be used to dispense the adhesive. The nozzle can be screwed in a container body, welded to the container or molded with the container as one piece, or the like. The dispensing system can include one attached to the tip of a pen-type container, one attached to the outlet of a tube used in an automatic applicator, and the like.

The cap in the invention is one having a structure that can seal up the tip of a nozzle or container body used in dispensing the adhesive composition. Examples thereof include generally known caps of the nozzle-covering type, those of the container-covering type (double container) and the like.

The tube used in the invention is one connecting the container for the adhesive composition and the nozzle, and the adhesive composition is conveyed to the nozzle through this tube. This system is used in automatic applicators for adhesive composition or the like. Usually, a plastic tube having a narrow diameter is used.

At least a part or the whole of containers used for the adhesive composition, nozzles, caps and tubes used with the adhesive system of the invention is made of a plastic material.

Examples of the plastic material used for the nozzle, cap, tube or the like include plastics such as polyethylene, polypropylene, polyvinyl chloride, polystyrene, polyacetals, polycarbonates, polyethylene terephthalate, polytetrafluoroethylene and other fluorine resins, amorphous polyarylates and the like. Amongst them, polyethylene, polypropylene and polytetrafluoroethylene are preferred. They can be used independently or in a mixture or multi-layer structure, when required.

Examples of the plastic material for use in the container for the adhesive composition, i.e., the container for filling the α-cyanoacrylate adhesive composition, include, in addition to the above described plastics, poly-4-methylpenetene-1, ionomers, polyvinylidene chloride, ABS resins, methacrylic resins, polyvinyl alcohol, cellulose plastics, TPE, epoxy resins, unsaturated polyester resins, phenol resins, urea-melamine resins, polyurethane resins, silicone resins, polyimide resins, photo-curable resins, modified polyphenylene ethers, polybutylene terephthalate, polybutynenaphthalate, polyphenylene sulfide, polysulfones, polyetherimides, polyethersulfones, polyetherketones, polyamideimides, polyallylethernitriles, polybenzimidazole and so on.

In addition to the plastic materials, metallic materials such as aluminum and the like are usable. Particularly suitable materials for use in the container are polyethylene, polypropylene, polytetrafluoroethylene and aluminum.

They can be used independently or in a mixture or multi-layer structure, when required.

Suitable α-cyanoacrylates used in the present invention include, for example, α-cyanoacrylate represented by the following general formula (2):

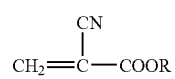
(2)

wherein R represents a saturated or unsaturated aliphatic or alicyclic group having 1 to 16 carbon atoms or an aromatic group.

Specific examples of the α-cyanoacrylate include esters of α-cyanoacrylic acid such as methyl, ethyl n-propyl, isopropyl, n-butyl, isobutyl, sec-butyl, octyl, neopentyl, cyclohexyl, ethylhexyl, dodecyl, allyl, methoxyethyl, ethoxyethyl, methoxypropyl, benzyl, phenyl, silyl, chloroethyl esters and the like. These α-cyanoacrylates can be used singly or in admixture of two or more.

The 12-crown-4-ether used in the invention can be synthesized according to known processes. General synthetic processes include processes described in JP-A-54-119483, JP-B-59-27351, JP-B-59-519, JP-A-53-98985, Tetrahedron Letters, Vol. 37, No. 14, pages 2463–2466 (1996) and others.

The amount of 12-crown-4-ether to be added to the α-cyanoacrylate is 0.05 to 5.0% by weight based on the α-cyanoacrylate, and 0.1 to 3.0% by weight is a preferred range. When the amount is too small, the curing velocity is insufficient and, when the amount is too much, the storage stability becomes bad.

Furthermore, the inventors have found that the pH value of 10% by weight aqueous diluted solution of 12-crown-4-ether correlates with the performance of the adhesive composition, and that when 12-crown-4-ether having a pH value of 8.0 or less is selected for use, a superior performance can be obtained.

According to the above-described finding, it is preferred, in the present invention, that 12-crown-4-ether having a pH value of 8.0 or less in 10% by weight aqueous diluted solution is selectively used. It is more preferred that one having a pH value of 2.0 to 7.5 is selectively used.

In the α-cyanoacrylate adhesive composition used in the present invention, the hardening accelerating effect of the 12-crown-4-ether can be more improved by adding a specific polyhydroxy compound. Preferred polyhydroxy compounds include polyhydroxy compounds represented by the following general formula (1):

(1)

wherein r represents an integer of 2 to 6; at least two hydroxyl groups are substituted on adjacent positions; Y represents hydrogen, straight chain or branched chain alkyl, alkoxy, carboxyl, alkoxycarbonyl or halogen; and s represents an integer of 0 to 4.

Specific examples include pyrogallol, catechol, di-t-butylcatechol, 1,2,4-trihydroxybenzene, hexahydroxybenzene, gallic acid, ethyl gallate, methoxyethyl gallate, dichlorogallic acid and the like. They can be used singly or in admixture of two or more, when required.

The amount of said polyhydroxy compound to be added is preferably 0.001 to 1.0% by weight, more preferably 0.005 to 0.5% by weight, based on the α-cyanoacrylate.

It is preferred that an anionic inhibitor is comprised in the α-cyanoacrylate adhesive composition. Suitable anionic inhibitor specifically includes sulfur dioxide, methanesulfonic acid, trifluoromethanesulfonic acid, p-toluenesulfonic acid, boron trifluoride diethyl etherate, $HBF_4$, trialkyl borate and the like. These compounds can be used singly or in combination of two or more according to the desired object. Particularly preferred combination is $HBF_4$ and sulfur dioxide. The range of amount of said anionic inhibitor to be used is preferably 0.1 to 100 ppm, more preferably 0.5 to 50 ppm, respectively.

The α-cyanoacrylate adhesive composition according to the invention may further comprise a thickener. Examples of the thickener includes homopolymer of a methacrylic acid ester, copolymers of different methacrylic acid esters, copolymers of methacrylic acid ester and acrylic acid ester, acrylic rubbers, polyesters, polyvinyl chloride, polystyrene, cellulose esters, polyalkyl α-cyanoacrylate, ethylene-vinyl acetate copolymer and the like. These may be used singly or in combination of two or more. Examples of specific compounds include polyalkyl methacrylates such as polymethyl methacrylate, polyethyl methacrylate, polypropyl methacrylate, polybutyl methacrylate and the like as the homopolymer of a methacrylic acid ester. Examples of compounds for use as a raw material for the copolymers of different methacrylic acid esters and the copolymers of methacrylic acid ester with acrylic acid ester include methyl methacrylate, ethyl methacrylate, n-propyl methacrylate, isopropyl methacrylate, n-butyl methacrylate, isobutyl methacrylate, methyl acrylate, ethyl acrylate, n-propyl acrylate, isopropyl acrylate, n-butyl acrylate, isobutyl acrylate and the like. The homopolymer of an methacrylic acid ester, copolymers of different methacrylic acid esters, and copolymers of methacrylic acid ester with acrylic acid ester preferably has a weight average molecular weight of 100,000 to 2,000,000. The amount of the thickener to be contained is preferably 0.1 to 50% by weight, more preferably 1 to 30% by weight, based on the α-cyanoacrylate.

If necessary, the α-cyanoacrylate adhesive composition according to the invention further comprises a radical inhibitor. Examples of the radical inhibitor include hydroquinone, hydroquinone monomethyl ether, pyrogallol, catechol, t-butylcatechol and the like. The amount of the radical inhibitor to be added is preferably 0.001 to 1.0% by weight, more preferably 0.005 to 0.5% by weight, based on the α-cyanoacrylate.

The α-cyanoacrylate adhesive composition used in the invention can be used with suitable addition of plasticizer, coloring agent, perfume, solvent, adhesive strength improving agent, inorganic filler and the like according to the desired usage, within a range in which the storage stability and fast setting property of the α-cyanoacrylate monomer is inhibited.

Examples of the plasticizer herein include dimethyl phthalate, diethylphthalate, dibutylphthalate, 2-ethylhexyl phthalate, diisodecyl phthalate, trimethyl acetylcitrate, triethyl acetylcitrate, tributyl acetylcitrate and the like.

As the inorganic filler, hydrophobic silica, hydrophilic silica and the like can be added as thixotropic property conferring agent.

The α-cyanoacrylate adhesive according to the invention has an excellent fast setting property in the adhesion of hard to adhere materials such as acryl resins, chrome plating, nickel plating, FRP, Bakelite, TPE, EPDM rubbers and the like, and porous materials such as papers, woods, leathers, ceramics and the like, rarely sets during storage and has excellent storage stability despite being used with a plastic material such as a nozzle, cap, tube and container for the adhesive composition.

The invention will now be described in more detail with reference to Examples, which should not be construed to limit the scope of the invention.

Measurements and evaluation in Examples were carried out according to the following methods:

<Set time (Measurement and evaluation of fast setting property)>

Measurement was carried out according to JIS K6861 using paper, Oregon Pine, EPDM rubber and acrylic resin as a material to be adhered (unit: second).

A shorter set time corresponds to an excellent fast setting property.

<Storage stability (Measurement and evaluation of storage stability for an adhesive composition contained in a container body)>

Into a polyethylene bottle (a tubular container having a length of 47 mm, a diameter of 11 mm and an outlet diameter of 5 mm, with a conic nozzle having a length of 31 mm, a bottom diameter of 11 mm and an outlet diameter of about 1 mm) was placed 2 g of an adhesive composition and gelling time was measured in an atmosphere of 60° C. and 95% RH.

Exposure was carried out under heating and humidifying conditions in order to reproduce actual circumstance having humidity, using, as the container, a polyethylene bottle generally used as a container for α-cyanoacrylate adhesives composition.

The storage stability was evaluated with the following scores according to days spent before gelation.

◎: equal to or more than 13 days; ○:10 to 12 days;

Δ: 6 to 9 days; X: equal to or less than 5 days.

<Nozzle-clogging resistance (Measurement and evaluation of storage stability for an adhesive composition in a nozzle)>

Into an aluminum tube (having a length of 45 mm, a diameter of 13 mm and an outlet diameter of 4 mm) was placed 3 g of an adhesive composition. After unsealing, a polyethylene nozzle (cone having a length of 25 or 31 mm, a bottom diameter of 12 or 13 mm and an outlet diameter of 1 mm) and a cap on the nozzle tip (a cone having a length of 32 or 35 mm, a bottom diameter of 14 or 15 mm) were attached.

Then composition was applied on a commercially available NBR test piece (1×25×100 mm, manufactured by Nippon Testpanel Co., Ltd.) for about 10 cm (0.05 g), contacting the nozzle tip thereon. After allowing the nozzle to stand for 30 minutes covering the nozzle tip with the cap, the composition was applied on a NBR in the same manner and the nozzle tip was covered. The nozzle was exposed in this condition to an atmosphere of 60° C. and 95% RH and days were counted until the adhesive composition could not be squeezed due to setting of the composition stayed in the nozzle and clogging of the nozzle.

The nozzle-clogging resistance was evaluated with the following scores according to days spent before clogging.

◎: equal to or more than 10 days; ○:7 to 9 days; Δ: 4 to 6 days; X: equal to or less than 3 days.

EXAMPLE 1

An adhesive composition was prepared by adding 10 ppm of $HBF_4$ and 10 ppm of $SO_2$ as anion inhibitors, 1,500 ppm of hydroquinone as a radical inhibitor and 4% by weight of PMMA (manufactured by Sumitomo Chemical Co., Ltd.) having a weight average molecular weight of 900,000 as a thickener to ethyl α-cyanoacrylate, followed by further addition of 1.2% by weight of 12-crown-4-ether having a pH value of 6.9 in 10% by weight diluted aqueous solution as a crown ether compound. The set time, storage stability and nozzle-clogging resistance of this adhesive composition were measured and the results are shown in Table 1.

EXAMPLE 2

An adhesive composition was prepared in the same manner as in Example 1 except that the amount of 12-crown-4-ether having a pH value of 6.9 in 10% by weight diluted aqueous solution was changed to 0.3% by weight based on ethyl α-cyanoacrylate. The set time, storage stability and nozzle-clogging resistance of this adhesive composition were measured and the results are shown in Table 1.

COMPARATIVE EXAMPLE 1

An adhesive composition was prepared in the same manner as in Example 1 except that 12-crown-4-ether having a pH value of 6.9 in 10% by weight diluted aqueous solution was replaced by 15-crown-5-ether having a pH value of 7.6 in 10% by weight diluted aqueous solution (Tokyo Kasei's reagent) and its amount was changed to 0.5% by weight based on ethyl α-cyanoacrylate. The set time, storage stability and nozzle-clogging resistance of this adhesive composition were measured and the results are shown in Table 1.

COMPARATIVE EXAMPLE 2

An adhesive composition was prepared in the same manner as in Example 1 except that 12-crown-4-ether having a pH value of 6.9 in 10% by weight diluted aqueous solution was replaced by 18-crown-6-ether having a pH value of 6.6 in 10% by weight diluted aqueous solution (Tokyo Kasei's reagent) and its amount was changed to 0.5% by weight based on ethyl α-cyanoacrylate. The set time, storage stability and nozzle-clogging resistance of this adhesive composition were measured and shown in Table 1.

COMPARATIVE EXAMPLE 3

An adhesive composition was prepared in the same manner as in Example 1 except that 12-crown-4-ether having a pH value of 6.9 in 10% by weight diluted aqueous solution was replaced by 18-crown-6-ether having a pH value of 6.6 in 10% by weight diluted aqueous solution (Tokyo Kasei's reagent) and its amount was changed to 0.01% by weight based on ethyl α-cyanoacrylate. The set time, storage stability and nozzle-clogging resistance of this adhesive composition were measured and the results are shown in Table 1.

COMPARATIVE EXAMPLE 4

An adhesive composition was prepared in the same manner as in Example 1 except that 12-crown-4-ether having a pH value of 6.9 in 10% by weight diluted aqueous solution was replaced by t-butylcalix-6-arene having a pH value of 7.0 in 10% by weight diluted aqueous solution (Aldrich's reagent) and its amount was changed to 0.3% by weight based on ethyl α-cyanoacrylate. The set time, storage stability and nozzle-clogging resistance of this adhesive composition were measured and the results are shown in Table 1.

COMPARATIVE EXAMPLE 5

An adhesive composition was prepared by adding 10 ppm of $BF_3$ and 20 ppm of $SO_2$ as anion inhibitors, 500 ppm of hydroquinone as a radical inhibitor and 3% by weight of polymethyl methacrylate (manufactured by Sumitomo Chemical Co., Ltd.) having a weight average molecular weight of 900,000 as a thickener to ethyl α-cyanoacrylate, followed by further addition of 0.05% by weight of 18-crown-6-ether having a pH value of 6.6 in 10% by weight diluted aqueous solution (Tokyo Kasei's reagent) as a crown ether compound. The set time, storage stability and nozzle-clogging resistance of this adhesive composition were measured and the results are shown in Table 1.

EXAMPLE 3

An adhesive composition was prepared in the same manner as in Example 1 except that 12-crown-4-ether having a pH value of 6.9 in 10% by weight diluted aqueous solution was replaced by 12-crown-4-ether having a pH value of 6.0 in 10% by weight diluted aqueous solution and its amount was changed to 0.5% by weight based on ethyl α-cyanoacrylate. The set time, storage stability and nozzle-clogging resistance of this adhesive composition were measured and the results are shown in Table 2.

EXAMPLE 4

An adhesive composition was prepared in the same manner as in Example 3 except that 10 ppm of $HBF_4$ and 10 ppm of $SO_2$ was replaced by 15 ppm of $HBF_4$ alone based on ethyl α-cyanoacrylate. The set time, storage stability and nozzle-clogging resistance of this adhesive composition were measured and the results are shown in Table 2.

EXAMPLE 5

An adhesive composition was prepared in the same manner as in Example 3 except that 10 ppm of $HBF_4$ and 10 ppm of $SO_2$ was replaced by 30 ppm of $SO_2$ alone based on ethyl α-cyanoacrylate. The set time, storage stability and nozzle-clogging resistance of this adhesive composition were measured and the results are shown in Table 2.

EXAMPLE 6

An adhesive composition was prepared in the same manner as in Example 1 except that 12-crown-4-ether having a pH value of 6.9 in 10% by weight diluted aqueous solution was replaced by 12-crown-4-ether having a pH value of 3.8 in 10% by weight diluted aqueous solution and its amount was changed to 1.0% by weight based on ethyl α-cyanoacrylate. The set time, storage stability and nozzle-clogging resistance of this adhesive composition were measured and the results are shown in Table 3.

EXAMPLE 7

An adhesive composition was prepared in the same manner as in Example 6 except that 0.05% of pyrogallol was added based on ethyl α-cyanoacrylate. The set time, storage stability and nozzle-clogging resistance of this adhesive composition were measured and the results are shown in Table 3.

EXAMPLE 8

An adhesive composition was prepared in the same manner as in Example 4 except that PMMA having a weight average molecular weight of 900,000 was replaced by PMMA having a weight average molecular weight of 150,000 (manufactured by Sumitomo Chemical Co., Ltd.) and its amount was changed to 12% by weight based on ethyl α-cyanoacrylate. The set time, storage stability and nozzle-clogging resistance of this adhesive composition were measured and the results are shown in Table 4.

EXAMPLE 9

An adhesive composition was prepared in the same manner as in Example 4 except that PMMA having a weight average molecular weight of 900,000 was replaced by PMMA having a weight average molecular weight of 70,000 (manufactured by Sumitomo Chemical Co., Ltd.) and its amount was changed to 23% by weight based on ethyl α-cyanoacrylate. The set time, storage stability and nozzle-clogging resistance of this adhesive composition were measured and the results are shown in Table 4.

EXAMPLE 10

An adhesive composition was prepared in the same manner as in Example 1 except that 12-crown-4-ether having a pH value of 6.9 in 10% by weight diluted aqueous solution was replaced by 12-crown-4-ether having a pH value of 7.5 in 10% by weight diluted aqueous solution, its amount was 1.2% by weight based on α-cyanoacrylate and methyl cyanoacrylate was used as α-cyanoacrylate. The set time, storage stability and nozzle-clogging resistance of this adhesive composition were measured and the results are shown in Table 5.

EXAMPLE 11

An adhesive composition was prepared in the same manner as in Example 1 except that 12-crown-4-ether having a pH value of 6.9 in 10% by weight diluted aqueous solution was replaced by 12-crown-4-ether having a pH value of 7.5 in 10% by weight diluted aqueous solution, its amount was changed to 0.3% by weight based on α-cyanoacrylate and isopropyl cyanoacrylate was used as α-cyanoacrylate. The set time, storage stability and nozzle-clogging resistance of this adhesive composition were measured and the results are shown in Table 5.

EXAMPLE 12

An adhesive composition was prepared in the same manner as in Example 1 except that 12-crown-4-ether having a pH value of 6.9 in 10% by weight diluted aqueous solution was replaced by 12-crown-4-ether having a pH value of 7.5 in 10% by weight diluted aqueous solution, its amount was changed to 2.0% by weight based on α-cyanoacrylate and methoxyethyl cyanoacrylate was used as α-cyanoacrylate. The set time, storage stability and nozzle-clogging resistance of this adhesive composition were measured and the results are shown in Table 5.

EXAMPLE 13

An adhesive composition was prepared in the same manner as in Example 1 except that 12-crown-4-ether having a pH value of 6.9 in 10% by weight diluted aqueous solution was replaced by 12-crown-4-ether having a pH value of 7.5 in 10% by weight diluted aqueous solution, its amount was changed to 0.5% by weight based on α-cyanoacrylate and ethoxyethyl cyanoacrylate was used as α-cyanoacrylate. The set time, storage stability and nozzle-clogging resistance of this adhesive composition were measured and the results are shown in Table 5.

TABLE 1

| | Set time (second) | | | | Storage stability | Nozzle-clogging resistance |
|---|---|---|---|---|---|---|
| | Paper | Oregon Pine | EPDM rubber | Acrylic resin | | |
| Example 1 | 10 | 15 | 10 | 60 | ⊚ | ○ |
| Example 2 | 30 | 40 | 15 | 120 | ⊚ | ⊚ |
| Comparative example 1 | 30 | 40 | 20 | 180 | Δ | Δ |
| Comparative example 2 | 10 | 20 | 10 | 120 | X | X |
| Comparative example 3 | 60 | 180 | 30 | 240 | ○ | Δ |
| Comparative example 4 | 20 | 20 | 30 | 150 | Δ | Δ |
| Comparative example 5 | 30 | 50 | 15 | 120 | Δ | Δ |

TABLE 2

| | Set time (second) | | | | Storage stability | Nozzle-clogging resistance |
|---|---|---|---|---|---|---|
| | Paper | Oregon Pine | EPDM rubber | Acrylic resin | | |
| Example 3 | 20 | 30 | 15 | 100 | ⊚ | ○ |
| Example 4 | 20 | 30 | 15 | 100 | ○ | ○ |
| Example 5 | 20 | 25 | 15 | 100 | ○ | ○ |

TABLE 3

| | Set time (second) | | | | Storage stability | Nozzle-clogging resistance |
|---|---|---|---|---|---|---|
| | Paper | Oregon Pine | EPDM rubber | Acrylic resin | | |
| Example 6 | 10 | 20 | 10 | 80 | ⊚ | ○ |
| Example 7 | 5 | 15 | 10 | 80 | ⊚ | ○ |

TABLE 4

| | Set time (second) | | | | Storage stability | Nozzle-clogging resistance |
|---|---|---|---|---|---|---|
| | Paper | Oregon Pine | EPDM rubber | Acrylic resin | | |
| Example 8 | 10 | 20 | 10 | 80 | ⊚ | ○ |
| Example 9 | 10 | 20 | 10 | 80 | Δ | ○ |

TABLE 5

| | Set time (second) | | | | Storage stability | Nozzle-clogging resistance |
|---|---|---|---|---|---|---|
| | Paper | Oregon Pine | EPDM rubber | Acrylic resin | | |
| Example 10 | 10 | 15 | 10 | 60 | ⊚ | ⊚ |
| Example 11 | 30 | 40 | 30 | 180 | ⊚ | ⊚ |
| Example 12 | 15 | 30 | 15 | 120 | ⊚ | ⊚ |
| Example 13 | 40 | 50 | 40 | 250 | ⊚ | ⊚ |

The invention claimed is:

1. An adhesive system containing elements for housing and dispensing an adhesive composition which comprises an α-cyanoacrylate and 0.05 to 5.0% by weight based on said α-cyanoacrylate of 12-crown-4-ether, wherein said elements are made at least in part of polyethylene.

2. An adhesive system which consists of an α-cyanoacrylate adhesive composition comprising an α-cyanoacrylate and 0.05 to 5.0% by weight, based on said α-cyanoacrylate, of 12-crown-4-ether, a container for containing said α-cyanoacrylate adhesive composition, a nozzle and a cap and, optionally a tube, at least a part of said container, nozzle, cap and tube being made of polyethylene.

3. The adhesive system according to claim 2, wherein the amount of 12-crown-4-ether is 0.1 to 3.0% by weight based on the α-cyanoacrylate.

4. The adhesive system according to claim 2, wherein the 12-crown-4-ether has a pH value of 8.0 or less in a 10% by weight aqueous diluted solution.

5. The adhesive system according to claim 2, wherein the α-cyanoacrylate adhesive composition further comprises a polyhydroxy compound represented by the following general formula (1):

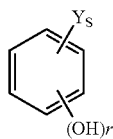

(1)

wherein r represents an integer of 2 to 6; at least two hydroxyl groups are substituted on adjacent positions; Y represents hydrogen, straight chain or branched chain alkyl, alkoxy, carboxyl, alkoxycarbonyl or halogen; and s represents an integer of 0 to 4, in an amount of 0.001 to 1.0% by weight based on the α-cyanoacrylate.

6. The adhesive system according to claim 2, wherein the α-cyanoacrylate adhesive composition further comprises an anionic inhibitor.

7. The adhesive system according to claim 6, wherein the anionic inhibitor is a combination of $HBF_4$ and sulfur dioxide.

8. The adhesive system according to claim 2, wherein the α-cyanoacrylate adhesive composition further comprises a homopolymer of a methacrylic acid ester, copolymers of different methacrylic acid esters or copolymers of methacrylic acid ester and acrylic acid ester, as a thickener, which has a weight average molecular weight of 100,000 to 2,000,000, in an amount of 0.1 to 50% by weight based on the α-cyanoacrylate.

9. The adhesive system according to claim 1, wherein the amount of 12-crown-4-ether is 0.1 to 3.0% by weight based on the α-cyanoacrylate.

10. The adhesive system according to claim 1, wherein the 12-crown-4-ether has a pH value of 8.0 or less in a 10% by weight aqueous diluted solution.

11. The adhesive system according to claim 1, wherein the α-cyanoacrylate adhesive composition further comprises a polyhydroxy compound represented by the following general formula (1):

wherein r represents an integer of 2 to 6; at least two hydroxyl groups are substituted on adjacent positions; Y represents hydrogen, straight chain or branched chain alkyl, alkoxy, carboxyl, alkoxycarbonyl or halogen; and s represents an integer of 0 to 4, in an amount of 0.001 to 1.0% by weight based on the α-cyanoacrylate.

12. The adhesive system according to claim 1, wherein the α-cyanoacrylate adhesive composition further comprises an anionic inhibitor.

13. The adhesive system according to claim 12, wherein the anionic inhibitor is a combination of $HBF_4$ and sulfur dioxide.

14. The adhesive system according to claim 1, wherein the α-cyanoacrylate adhesive composition further comprises a homopolymer of a methacrylic acid ester, copolymers of different methacrylic acid esters or copolymers of methacrylic acid ester and acrylic acid ester, as a thickener, which has a weight average molecular weight of 100,000 to 2,000,000, in an amount of 0.1 to 50% by weight based on the α-cyanoacrylate.

* * * * *